United States Patent [19]

Verhey

[11] 4,235,446
[45] Nov. 25, 1980

[54] SEALING BUSHING FOR A MEMBER ROTATABLE ABOUT AN AXIS AND EXTENDING THROUGH A WALL OF A HOUSING

[75] Inventor: Leendert A. Verhey, Hazerswoude-Rijndijk, Netherlands

[73] Assignee: B. V. Neratoom, The Hague, Netherlands

[21] Appl. No.: 14,324

[22] Filed: Feb. 22, 1979

[30] Foreign Application Priority Data

Mar. 1, 1978 [NL] Netherlands .......................... 7802285

[51] Int. Cl.³ ............................................. F16J 15/40
[52] U.S. Cl. .................................... 277/135; 277/134
[58] Field of Search ............... 277/212 R, 57, 92, 135, 277/134, 53, 212 C

[56] References Cited

U.S. PATENT DOCUMENTS

| | | | |
|---|---|---|---|
| 1,888,475 | 11/1932 | Schmitz | 277/57 |
| 2,182,981 | 12/1939 | Drost et al. | 277/53 |
| 3,144,280 | 8/1964 | Sorenson | 277/57 |
| 3,410,335 | 11/1968 | Malmstrom | 277/135 |
| 3,782,735 | 1/1974 | Novosad | 277/92 |
| 4,010,960 | 3/1977 | Martin | 277/134 |

FOREIGN PATENT DOCUMENTS 2116457 7/1972 France .
916150 1/1963 United Kingdom .

*Primary Examiner*—Lenard A. Footland
*Attorney, Agent, or Firm*—Kenyon & Kenyon

[57] ABSTRACT

A sealing bushing for a member including a shaft rotatable about an axis and extending through a wall of a housing, which bushing comprises a sleeve fixedly connected to the wall of the housing and a sleeve fixedly connected to the shaft of the rotatable member. The last-named sleeve is concentrically received in the first-named sleeve to define a small clearance therebetween. The sleeve connected to the shaft is fixedly secured thereto by means of a sealing member of rubber or a similar material.

5 Claims, 1 Drawing Figure

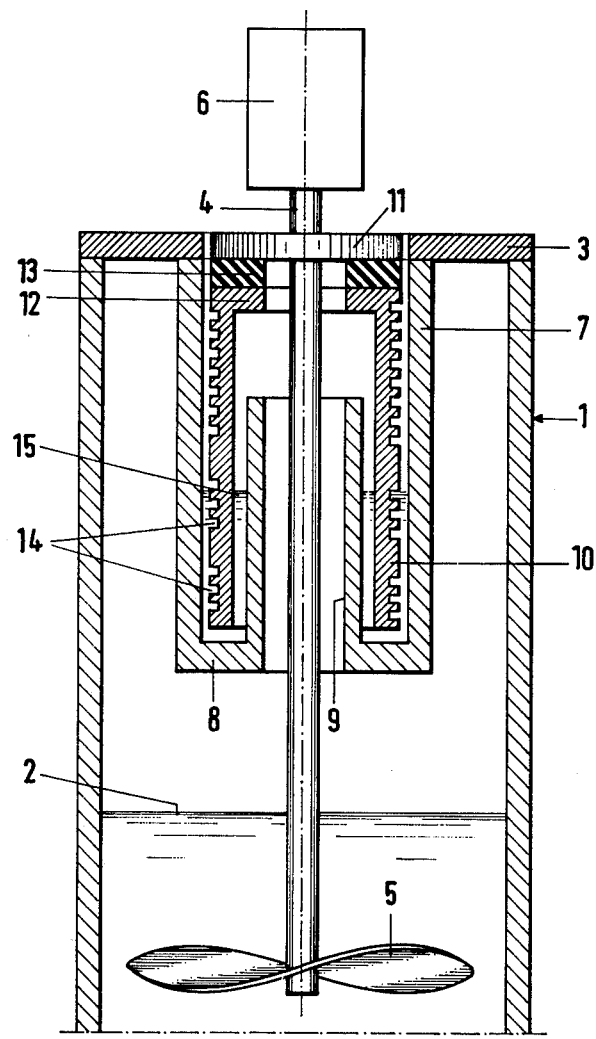

SEALING BUSHING FOR A MEMBER ROTATABLE ABOUT AN AXIS AND EXTENDING THROUGH A WALL OF A HOUSING

The invention relates to a sealing bushing for a member rotatable about an axis and extending through a wall of a housing, which bushing comprises a sleeve connected to the wall and a shaft of the rotatable member, which shaft extends concentrically through the sleeve, and a sleeve having its upper end fixedly connected to the shaft, which sleeve is concentrically received in the sleeve connected to the wall, the sleeve connected to the shaft and the sleeve connected to the wall being dimensioned to define a small clearance between them.

Such a bushing is known from Dutch patent application No. 7017502.

This publication describes in particular a sealing bushing of the viscoseal type. The sleeve connected to the housing is provided with a helical groove in the portion of its circumferential surface that is opposite the sleeve connected to the shaft of the rotatable member and defines the small clearance. Rotation of the shaft causes a sealing pressure to be unidirectionally built up by means of a liquid entrapped in the small clearance. The sleeve connected to the shaft of the rotatable member is secured thereto by means of, for example, a split ring and a locking bolt. To prevent the sealing liquid from escaping through gaps between the shaft and the sleeve secured thereto, an O-shaped ring is placed therebetween. A drawback inherent in this known structure is the rigidity of the connection between the sleeve and the shaft of the rotatable member, so that any slight deviation of the rotatable member relative to the (imaginary) axis of rotation is transferred to the sleeve, as a result whereof this sleeve is liable to contact the sleeve connected to the housing. This may result in a relatively high rate of wear.

It is an object of the invention to provide a bushing in which this drawback is completely or substantially absent. This object is achieved by means of a bushing in which the sleeve connected to the shaft is secured thereto by means of an annular sealing member of rubber or a similar material. Preferably, the shaft of the rotatable member is provided with a metal flange and the upper end of the sleeve is likewise provided with a metal flange, the annular member of rubber or similar material being mounted between these two flanges. The annular member may be fixedly connected to the flanges by vulcanization in a convenient manner.

An advantage inherent in the bushing according to the invention is that, while the turning moment of the rotatable member is excellently transferred to the sleeve connected thereto, lateral displacements of the rotating sleeve under the influence of small forces are always possible. In this manner it is achieved that the rotating sleeve will rotate concentrically relative to the stationary sleeve secured to the housing at all times, i.e. independently of the position of the shaft of the rotatable member. Furthermore, the ring of rubber or similar material has excellent vibration damping properties, as a result whereof far less wear occurs than in the prior structure and hence the service life of the bushing is increased. Moreover, the structure according to the invention permits the different components to be manufactured with highly accurate tolerances with respect to size and shape.

An additional advantage of the bushing according to the invention is that the ring of rubber or similar material has good sealing properties against gases and liquids, so that it is not necessary to use O-shaped rings or the like for sealing the gap between the rotatable member and the sleeve connected thereto.

By the above term "similar material" a material should be understood that has vibration damping and sealing properties comparable to those of rubber.

The invention will be elucidated hereinafter with reference to the accompanying drawing, in which the single FIGURE schematically shows a cross-sectional view of an embodiment of the bushing according to the invention as used for sealingly passing the shaft of a rotatable member, e.g. the shaft of a pump, through the wall of a vessel.

The FIGURE shows a vessel 1 containing, for example, a liquid 2. A shaft 4 of a pump extends into the vessel 1 through an opening in the cover 3 on vessel 1. To the lower end of shaft 4 there is attached, for example, the pump impeller 5. Shaft 4 with pump impeller 5 can be rotated by means of the motor 6. Shaft 4 may be bearing-mounted adjacent its passage through cover 3. Shaft 4 may further be bearing-mounted at other places, for example adjacent motor 6 and adjacent pump impeller 5. The bushing according to the invention essentially comprises the sleeve 7 secured to the cover 3 of the vessel. Sleeve 7 has its lower end provided with a flange 8 directed towards the shaft. A sleeve 9 is secured to flange 8, which sleeve 9 is concentric with sleeve 7. The sleeve 10 fixedly connected to shaft 4 is received in the space between sleeves 7 and 9. Sleeve 10 and sleeve 7 define a small clearance into which the sealing liquid 15 can penetrate from the space between sleeve 10 on the one hand and flange 8 and sleeve 9 on the other. Sleeve 10 has its outer circumferential surface provided with helical grooves 14. These grooves 14 are formed so that during operation, when sleeve 10 connected to shaft 4 is rotating, a pressure head is built up in the sealing liquid 15 in the clearance between sleeves 7 and 10, thereby ensuring a proper sealing. Means (not shown) are provided at the upper end of the clearance between sleeves 7 and 10 to ensure that no liquid 15 or gas can escape from the vessel when the shaft is at rest. The sealing liquid 15 may be oil.

In the embodiment of the bushing according to the invention as shown in the FIGURE, sleeve 10 is secured to shaft 4 as follows. Shaft 4 is provided with a flange or collar 11. Sleeve 10 has its upper end provided with a flange 12 directed towards the axis of the sleeve. Flange 12 is attached to collar 11 by means of the ring 13 of rubber or similar suitable material. Ring 13 may be conveniently secured to flange 12 and collar 11 by vulcanization. By using the ring 13 of rubber or similar flexible material it is achieved that, when shaft 4 is rotating, sleeve 10 will always rotate concentrically relative to sleeves 7 and 9. In this manner, sleeve 10 is bearing-mounted, so to speak, in sleeves 7 and 9. Vibrations of shaft 4 and slight deviations thereof relative to the axis of rotation are drastically damped by ring 13, so that such vibrations and deviations are practically not transferred to sleeve 10. Moreover, ring 13 provides an adequate sealing, so that liquid or gas present between sleeve 10 and shaft 4 cannot escape from vessel 1 along ring 13 and flange 12 and collar 11.

It will be clear that the FIGURE only very schematically shows the embodiment of the sealing bushing according to the invention. The manner in which sleeve 7 is secured to the cover 3 on vessel 1 may of course vary. It is essential only that there is a sleeve which is secured to vessel 1 in such a manner that this sleeve cannot move relative to the axis of rotation of pump shaft 4. The manner in which sleeve 10 rotating with shaft 4 is connected to this shaft 4 may be varied too. In accordance with the invention, it is essential only that an annular member of rubber or similar flexible material is mounted in one way or another between sleeve 10 and shaft 4, which member provides a proper, fixed connection between sleeve and shaft but drastically suppresses vibrations and shocks.

I claim:

1. A sealing bushing for a member having a shaft rotatable about an axis and extending through a wall of a housing, said bushing comprising a first metal sleeve fixedly secured to the wall and concentric with the shaft of the rotatable member, which shaft extends through the sleeve, and a second metal sleeve having one end fixedly connected to the shaft, said second sleeve being concentrically received in the first sleeve secured to the wall, the outer surface of the second sleeve connected to the shaft and the inner surface of the first sleeve secured to the wall being dimensioned to define a small radial clearance between them maintaining a sealing liquid in said clearance, wherein the improvement comprises an annular means of a material having substantial vibrational damping characteristics resiliently and sealingly connecting said second sleeve to the shaft, whereby vibrations of the rotating shaft will not cause physical contact between the rotating and fixed parts of the sealing bushing.

2. A sealing bushing according to claim 1, further comprising a first metal flange mounted on the shaft and a second metal flange formed on the one end of the second sleeve, the annular resilient sealing member being mounted between the two flanges.

3. A sealing bushing according to claim 2, wherein the annular resilient sealing member is fixedly secured to the two flanges by vulcanization.

4. A sealing bushing according to claim 1 further comprising a sealing liquid maintained in the small radial clearance space between the first and second sleeves.

5. A sealing bushing according to claim 1 wherein the material of the annular resilient member comprises rubber.

* * * * *